US009608248B2

(12) United States Patent
Hotta et al.

(10) Patent No.: US 9,608,248 B2
(45) Date of Patent: Mar. 28, 2017

(54) ASSEMBLED BATTERY AND POWER CONSUMPTION APPARATUS

(75) Inventors: Shin Hotta, Tokyo (JP); Shinichi Uesaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/274,792

(22) Filed: Oct. 17, 2011

(65) Prior Publication Data

US 2012/0107651 A1     May 3, 2012

(30) Foreign Application Priority Data

Nov. 1, 2010   (JP) ................................. 2010-245199

(51) Int. Cl.
*H01M 2/20* (2006.01)
*H01M 2/34* (2006.01)
*H01M 10/052* (2010.01)
*H02J 7/00* (2006.01)

(52) U.S. Cl.
CPC ............ *H01M 2/202* (2013.01); *H01M 2/34* (2013.01); *H01M 10/052* (2013.01); *H01M 2200/00* (2013.01); *H02J 7/0026* (2013.01)

(58) Field of Classification Search
USPC ...... 429/500, 620.01; 320/116–123; 361/104
See application file for complete search history.

(56) References Cited

U.S. PATENT DOCUMENTS 5,903,423 A * 5/1999 Okano et al. ................. 361/103
2005/0121067 A1* 6/2005 Toyomura et al. ........... 136/244
2007/0254194 A1* 11/2007 Mantese et al. ................ 429/12
2008/0258683 A1* 10/2008 Chang ........................... 320/112
2009/0029253 A1*  1/2009 Itou et al. ..................... 429/223
2010/0086841 A1*  4/2010 Moon ................. H01M 10/425
                                                                  429/156

(Continued)

FOREIGN PATENT DOCUMENTS

JP         08-017466         1/1996
JP         2002-010501       1/2002

(Continued)

OTHER PUBLICATIONS www.azom.com.*

(Continued)

*Primary Examiner* — Miriam Stagg
*Assistant Examiner* — Carmen Lyles-Irving
(74) *Attorney, Agent, or Firm* — K&L Gates LLP

(57) ABSTRACT

An assembled battery includes a plurality of secondary battery cell series modules each having a plurality of secondary battery cells connected in series, wherein in each secondary battery cell series module, the secondary battery cells are connected in series by a first connection member, the secondary battery cell constituting the secondary battery cell series module and the secondary battery cell constituting the secondary battery cell series module adjacent to the above secondary battery cell series module are connected in parallel by a second connection member, the electrical resistance value of the second connection member is higher than the electrical resistance value of the first connection member, and the melting point of a material constituting the second connection member is lower than the melting point of a material constituting the first connection member.

22 Claims, 5 Drawing Sheets

(56) References Cited

U.S. PATENT DOCUMENTS

| | | | |
|---|---|---|---|
| 2011/0031609 A1* | 2/2011 | Jo et al. | 257/692 |
| 2012/0133329 A1* | 5/2012 | Yoshida et al. | 320/116 |
| 2012/0135296 A1 | 5/2012 | Itoi et al. | |

FOREIGN PATENT DOCUMENTS

| | | |
|---|---|---|
| JP | 2002-150918 | 5/2002 |
| JP | 2004-031268 | 1/2004 |
| JP | 2006-109596 | 4/2006 |
| JP | 2008-135342 | 6/2008 |
| WO | 2011/151981 | 12/2011 |

OTHER PUBLICATIONS http://examples.yourdictionary.com (Apr. 21, 2015).*
Itoi et al. (WO 2011_151981) (a raw machine translation) (Abstract, Detailed Description & Drawings) (Aug. 12, 2011).*
Japanese Office Action issued Jul. 22, 2014, for corresponding Japanese Appln. No. 2010-245199.
Decision of Refusal issued in connection with Japanese Patent Application No. 2010-245199, dated Oct. 28, 2014. (8 pages).

* cited by examiner

ASSEMBLED BATTERY AND POWER CONSUMPTION APPARATUS

CROSS REFERENCES TO RELATED APPLICATIONS

The present application claims priority to Japanese Patent Application No. 2010-245199 filed on Nov. 1, 2010, the disclosure of which is incorporated herein by reference.

BACKGROUND

Battery packs have already been used in a variety of portable apparatuses such as a mobile telephone, a digital still camera, a portable game machine, a notebook type personal computer, and an electric-powered tool. Further, at present, the battery packs are being used not only in these, but also in the fields in which higher output or higher capacity is necessary, such as an electric power-assisted bicycle, an electric vehicle, and a household electrical storage device.

As a secondary battery cell incorporated into the battery pack, a lithium-ion secondary battery cell is present as one of those which are currently most vigorously used. The lithium-ion secondary battery cell can be repeatedly used through charging and is being used in a very wide range due to a number of features such as a high voltage output, high energy density, less self-discharge, and long service life. Further, in order to respond to demands for apparatus with higher output and higher capacity, cases are also being increased where a number of secondary battery cells (single cells) are connected in series or in parallel, thereby being used in the form of an assembled battery. Although such use has a big advantage, since a very large amount of energy is treated, more careful handling than in the past usage is necessary.

In a case where deterioration of the secondary battery cell constituting the assembled battery advances, so that an internal short-circuit occurs, excessive current flows in from all other secondary battery cells parallel-connected to the secondary battery cell. If such a phenomenon occurs, there is concern that a problem may arise in which not only the internal short-circuited secondary battery cell, but also the other secondary battery cells which are discharged rapidly produce heat.

As means for solving such a problem, in a technique disclosed in Japanese Unexamined Patent Application Publication No. 2008-135342, by disposing a current limiting element such as a constant current diode at a portion where the secondary battery cells are connected in parallel, generation of excessive electric current is suppressed. However, in the technique disclosed in the above Japanese unexamined patent application publication, there are problems in which not only the disposition of the secondary battery cell is limited by the shape of the current limiting element, but also the conductive member which interconnects the secondary battery cells is complicated and further, production costs increase.

SUMMARY

Therefore, it is desirable to provide an assembled battery in which despite a simple configuration and structure, high safety can be secured even in a case where an internal short-circuit has occurred in a secondary battery cell constituting the assembled battery, and a power consumption apparatus with such an assembled battery incorporated therein.

According to each of a first embodiment to a third embodiment of the present disclosure, there is provided an assembled battery including a plurality of secondary battery cell series modules each having a plurality of secondary battery cells connected in series, wherein in each secondary battery cell series module, the secondary battery cells are connected in series by a first connection member, and the secondary battery cell constituting the secondary battery cell series module and the secondary battery cell constituting the secondary battery cell series module adjacent to the above secondary battery cell series module are connected in parallel by a second connection member.

Then, in the assembled battery related to the first embodiment of the present disclosure, the electrical resistance value of the second connection member may be higher than the electrical resistance value of the first connection member, and the melting point of a material constituting the second connection member may be lower than the melting point of a material constituting the first connection member.

Further, in the assembled battery related to the second embodiment of the present disclosure, the electrical resistance value of the second connection member may be higher than the electrical resistance value of the first connection member, and a current breaker may be provided at one end of each secondary battery cell series module.

Further, in the assembled battery related to the third embodiment of the present disclosure, the electrical resistance value of the second connection member may be higher than the electrical resistance value of the first connection member, and when the electrical resistance value of a load which is electrically connected to the assembled battery is set to be $R_0$ and the electrical resistance value of the second connection member is set to be $R_2$, a relationship of $R_2/R_0 \geq 2$ is satisfied.

According to a fourth embodiment of the present disclosure, there is provided an assembled battery including a plurality of secondary battery cell series modules each having a plurality of secondary battery cells connected in series, wherein in each secondary battery cell series module, the secondary battery cells are connected in series by a first connection member and mutually supported by the first connection member, the secondary battery cell constituting the secondary battery cell series module and the secondary battery cell constituting another secondary battery cell series module are connected in parallel by a second connection member and mutually supported by the second connection member, and the electrical resistance value of the second connection member is higher than the electrical resistance value of the first connection member.

In the assembled batteries related to the first embodiment to the fourth embodiment of the present disclosure, the electrical resistance value of the second connection member is higher than the electrical resistance value of the first connection member. Therefore, in a case where an internal short-circuit does not occur in the secondary battery cell (hereinafter, such a secondary battery cell is referred to as a "normal secondary battery cell"), after an operation of the assembled battery enters into an equilibrium state, an electric current does not substantially flow between the secondary battery cells constituting the secondary battery cell series modules adjacent to each other. On the other hand, in a case where an internal short-circuit has occurred in the secondary battery cell (hereinafter, such a secondary battery cell is referred to as an "abnormal secondary battery cell"), an electric current flows from the secondary battery cells constituting the adjacent secondary battery cell series module into the abnormal secondary battery cell. However, since the second connection member is interposed, it is possible to keep a current value low. In this manner, in the assembled batteries related to the first embodiment to the fourth embodiment of the present disclosure, it is not necessary to provide a special element, and despite simple configuration and structure, even in a case where an internal short-circuit has occurred in the secondary battery cell constituting the assembled battery, high safety can be secured, and a significant increase in production costs is not caused.

Further, in the assembled battery related to the first embodiment of the present disclosure, since the melting point of a material constituting the second connection member is lower than the melting point of a material constituting the first connection member and the second connection member is melted and cut in a case where a great current flows in the second connection member, the second connection member also functions as a fuse, so that even higher safety can be secured. Further, in the assembled battery related to the second embodiment of the present disclosure, since the current breaker is provided at one end of each secondary battery cell series module, in a case where a great current flows in the secondary battery cell series module, the current breaker is operated, whereby the output from the secondary battery cell series module is stopped, so that even higher safety can be secured. Further, in the assembled battery related to the third embodiment of the present disclosure, since the electrical resistance value of the load and the electrical resistance value of the second connection member satisfy a predetermined relationship, it is possible to effectively suppress generation of an electric current in which a flow direction in the secondary battery cell is different from a normal direction. Further, in the assembled battery related to the fourth embodiment of the present disclosure, since the secondary battery cells are mutually supported by the first connection member and the second connection member, handling or the like of the assembled battery is facilitated.

Additional features and advantages are described herein, and will be apparent from the following Detailed Description and the figures.

DETAILED DESCRIPTION

Figure 1A:
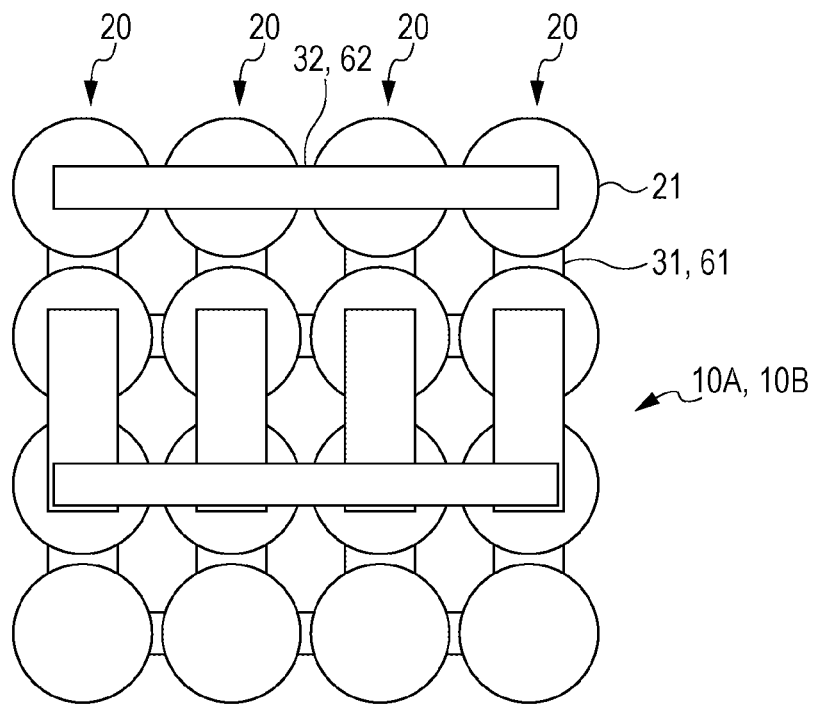
FIGS. 1A and 1B respectively are schematic diagrams of an assembled battery of Example 1 viewed from one side and the opposite side.

Embodiments of the present application will be described below in detail with reference to the drawings.

However, the present disclosure is not limited to the examples and various numerical values or materials in the examples are exemplifications. In addition, a description will be performed in the following order.

1. Assembled batteries related to a first embodiment to a fourth embodiment of the present disclosure and an overall explanation.

2. Example 1 (the assembled batteries related to the first embodiment, the third embodiment, and the fourth embodiment of the present disclosure).

3. Example 2 (the assembled batteries related to the second embodiment, the third embodiment, and the fourth embodiment of the present disclosure) and the others.

Assembled Batteries Related to First Embodiment to Fourth Embodiment of the Present Disclosure and an Overall Explanation In the assembled battery related to the first embodiment of the present disclosure, an embodiment is preferable in which the melting point of a material constituting a second connection member is, for example, 232° C. (this is the melting point of tin) or less. However, it is not limited thereto.

In the assembled battery related to the first embodiment of the present disclosure which includes the above preferred embodiment, or the assembled batteries related to the second embodiment to the fourth embodiment of the present disclosure, an embodiment is preferable in which when the electrical resistance value of a first connection member is set to be $R_1$ and the electrical resistance value of the second connection member is set to be $R_2$, a relationship of $R_2/R_1 \geq 10$, preferably, $R_2/R_1 \geq 100$ is satisfied.

In the assembled battery related to the first embodiment, the third embodiment, or the fourth embodiment of the present disclosure which includes the above preferred embodiment, a configuration can be made in which a current breaker is provided at one end of each secondary battery cell series module, and in this case, a configuration can be made in which when abnormality (for example, an internal short-circuit) has occurred in a secondary battery cell, the current breakers in the secondary battery cell series modules other than the secondary battery cell series module which includes the secondary battery cell in which the abnormality has occurred perform cutoff operations, and further, a configuration can be made in which occurrence of abnormality in the secondary battery cell is detected by the cutoff operation of the current breaker. Here, it is preferable if the current breaker is connected in series, for example, between an output end of each secondary battery cell series module and the secondary battery cell. As the current breaker, a fuse, or a PTC (Positive Temperature Coefficient) thermistor can be exemplified. In the case of the configuration in which occurrence of abnormality in the secondary battery cell is detected by the cutoff operation of the current breaker, specifically, it is preferable if a detecting section that detects, for example, a conduction/non-conduction state of the current breaker is disposed and generation of a cutoff operation in the current breaker is detected by detecting change-over of the current breaker which is in a conduction state to a non-conduction state. The same is true of the assembled battery related to the second embodiment of the present disclosure.

In the assembled battery related to the first embodiment, the second embodiment, or the fourth embodiment of the present disclosure which includes the above preferred embodiment, an embodiment can be made in which when the electrical resistance value of a load which is electrically connected to the assembled battery is set to be $R_0$ and the electrical resistance value of the second connection member is set to be $R_2$, a relationship of $R_2/R_0 \geq 2$, preferably, $R_2/R_0 \geq 10$ is satisfied. Here, as the value of $R_0$, a value in a range of $0.1\Omega$ to $10\Omega$ can be given as an example. However it is not limited thereto. The same is true of the assembled battery related to the third embodiment of the present disclosure.

In the assembled battery related to the second embodiment of the present disclosure which includes the above preferred embodiment, a configuration can be made in which when abnormality (for example, an internal short-circuit) has occurred in the secondary battery cell, the current breakers in the secondary battery cell series modules other than the secondary battery cell series module which includes the secondary battery in which the abnormality has occurred perform cutoff operations, and further, a configuration can be made in which occurrence of abnormality in the secondary battery cell is detected by the cutoff operation of the current breaker.

In the assembled battery related to the first embodiment of the present disclosure, as a material constituting the second connection member, tin (melting point: 232° C.); SK-AL-LOY series (melting point: 130° C. to 170° C.) or TSK series (melting point: 139° C. to 170° C.) made by Taihei Metal Industry Co., Ltd.; U alloy series made by Osaka Asahi Metal Mfg. Co., Ltd.; In (indium; melting point: 157° C.); indium-gold-based low-melting-point alloy; tin (Sn)-based high-temperature solder such as $Sn_{80}Ag_{20}$ (melting point: 220° C. to 370° C.) or $Sn_{95}Cu_5$ (melting point: 227° C. to 370° C.); lead (Pb)-based high-temperature solder such as $Pb_{97.5}Ag_{2.5}$ (melting point: 304° C.), $Pb_{94.5}Ag_{5.5}$ (melting point: 304° C. to 365° C.), or $Pb_{97.5}Ag_{1.5}Sn_{1.0}$ (melting point: 309° C.); zinc (Zn)-based high-temperature solder such as $Zn_{95}Al_5$ (melting point: 380° C.); tin-lead-based standard solder such as $Sn_5Pb_{95}$ (melting point: 300° C. to 314° C.) or $Sn_2Pb_{98}$ (melting point: 316° C. to 322° C.); or a brazing material such as $Au_{88}Ga_{12}$ (melting point: 381° C.) (all the above subscripts express atomic %) can be exemplified. In some cases, it is also possible to obtain the second connection member by mixing such a material in a band-shaped insulating material, for example. Further, in the assembled batteries related to the first embodiment to the fourth embodiment of the present disclosure, as a material constituting the first connection member, metal such as copper (Cu), aluminum (Al), nickel (Ni), or chrome (Cr), or an alloy of these can be exemplified.

In the assembled battery related to the fourth embodiment of the present disclosure, in order to mutually support the secondary battery cells by the first connection member, it is preferable if the first connection member is made of, for example, the above band-shaped material having rigidity. Similarly, in order to mutually support the secondary battery cells by the second connection member, it is preferable if the second connection member is made of, for example, the above band-shaped material having rigidity. In the assembled batteries related to the first embodiment to the fourth embodiment of the present disclosure, it is preferable if a mounting method of the first connection member on the secondary battery cells is appropriately selected depending on a material of the portion of the secondary battery cell on which the first connection member is mounted, or a material constituting the first connection member, and as the mounting method, a welding method which includes an ultrasonic welding method or a resistance welding method, a pressure welding method, a brazing method, or a soldering method can be given. The same is true of a mounting method of the second connection member on the secondary battery cells. In addition, in place of mounting the second connection member on the secondary battery cells, the second connection member may also be mounted on the first connection member mounted on the secondary battery cells.

In the assembled battery related to the first embodiment of the present disclosure, the electrical resistance value of the second connection member is higher than the electrical resistance value of the first connection member, and in the preferred embodiments of the assembled batteries related to the first embodiment to the fourth embodiment of the present disclosure, a relationship of $R_2/R_1 \geq 10$ is satisfied. However, such requirements can be achieved by appropriately selecting the materials constituting the first connection member and the second connection member and appropriately selecting the cross-sectional areas of the first connection member and the second connection member.

As the secondary battery cell, a lithium-ion secondary battery can be given. However, it is not limited thereto and it is preferable if the type of the secondary battery cell which is used is appropriately selected depending on the requested characteristics. The configuration and the structure of the secondary battery cell can be set to be an existing configuration and structure and the shape of the secondary battery cell can also be set to be an existing cylindrical shape or square shape. In order to control charge and discharge of the assembled battery, it is preferable to constitute a battery pack by the assembled battery and a charge and discharge control circuit. The charge and discharge control circuit can be constituted by an existing circuit provided with an MPU or a storage section (including, for example, an EEPROM). It is preferable if an electrical power supply of the charge and discharge control circuit is made by the secondary battery cell constituting the assembled battery. The charge and discharge control circuit is provided with an existing battery protection circuit, and in order to halt the function of the battery pack as appropriate, it is preferable if the battery protection circuit is operated.

The assembled battery in the present disclosure can be applied to a variety of power consumption apparatuses such as an electric vehicle (including a hybrid vehicle), a golf cart, an electric-powered cart, an electric-powered motorcycle, an electric-powered scooter, an electric power-assisted bicycle, a railway vehicle, an electric-powered tool such as an electric drill, an electric power supply unit, a home energy server (a household electrical storage device), a personal computer, a mobile telephone, a PDA (Personal Digital Assistance), a digital still camera, a video camera, a camcorder, an electronic book, an electronic dictionary, a music player, a radio, a headphone, a cordless telephone slave unit, an electric shaver, a refrigerator, an air conditioner, a television set, an image display device, a monitor, a stereo device, a water heater, a microwave oven, a dish washing machine, a washing machine, a drier, lighting apparatus such as an interior lamp, a game machine, a navigation system, a memory card, a pacemaker, a hearing aid, medical equipment, a toy, a robot, a load conditioner, and a signaler, for example, and can be used as electrical power supplies for driving or auxiliary power supplies of these power consumption apparatuses. That is, the power consumption apparatus according to an embodiment of the present disclosure is provided with the assembled battery related to each of the first embodiment to the fourth embodiment of the present disclosure, which include various preferred embodiments and configurations described above. Or, the assembled battery in the present disclosure can be applied to an apparatus such as a power supply for electric power storage for a building including a house or for power-generating facility, for example, can also be used in order to supply electric power to these apparatuses, and can also be used as an electrical storage device in a so-called smart grid. In addition, such an electrical storage device can not only supply electric power, but also store electricity by receiving supply of electric power from another electric power source. Further, the assembled battery in the present disclosure can also be incorporated into a home energy management system (HEMS) or a building energy management system (BEMS). Further, as an electric power supply for charging the secondary battery cells constituting the assembled battery, not only a commercial power supply, but also various solar cells, a fuel cell, thermal power-generating facility, nuclear power-generating facility, hydraulic power-generating facility, a wind power generator, a micro hydraulic power generator, a geothermal power generator, or the like can be exemplified and regenerative energy which is produced by the power consumption apparatus can also be exemplified. However, it is not limited to these.

Example 1

Figure 1B:
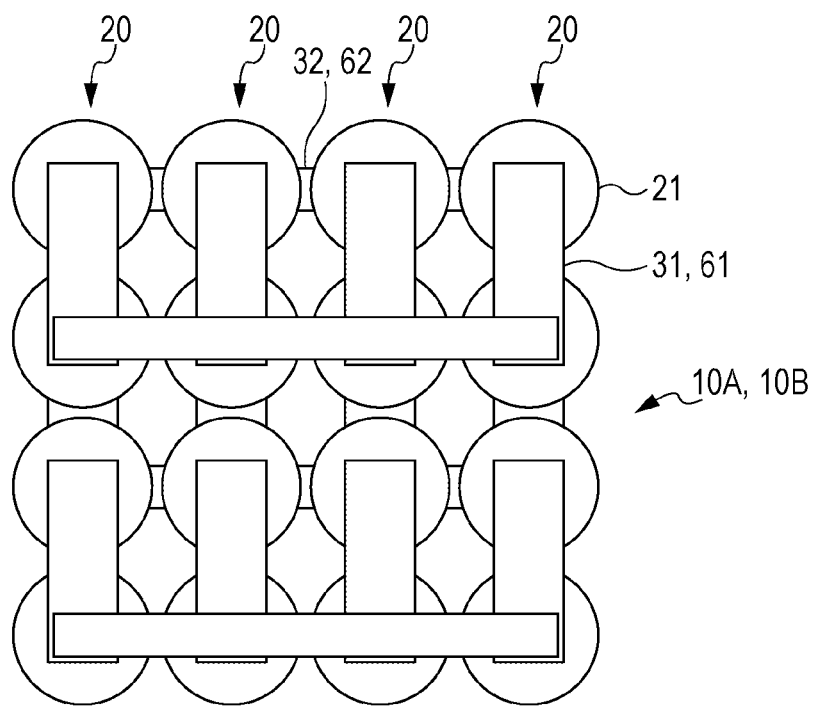
Figure 2:
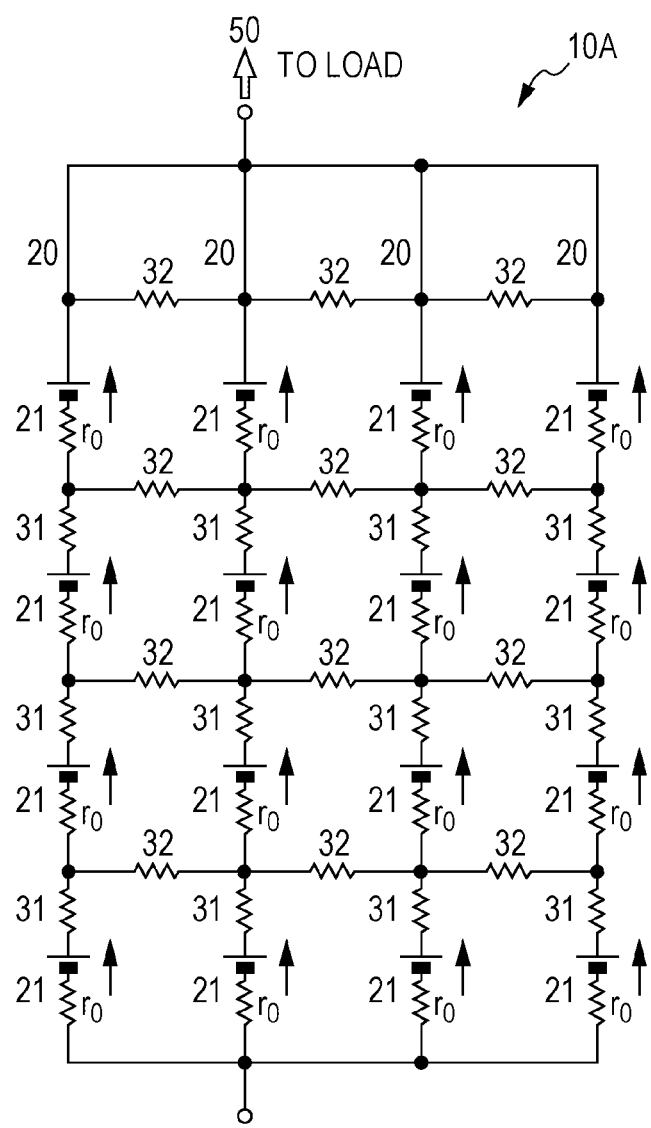
FIG. 2 is a circuit diagram when the assembled battery of Example 1 is normally operated.
Figure 3:
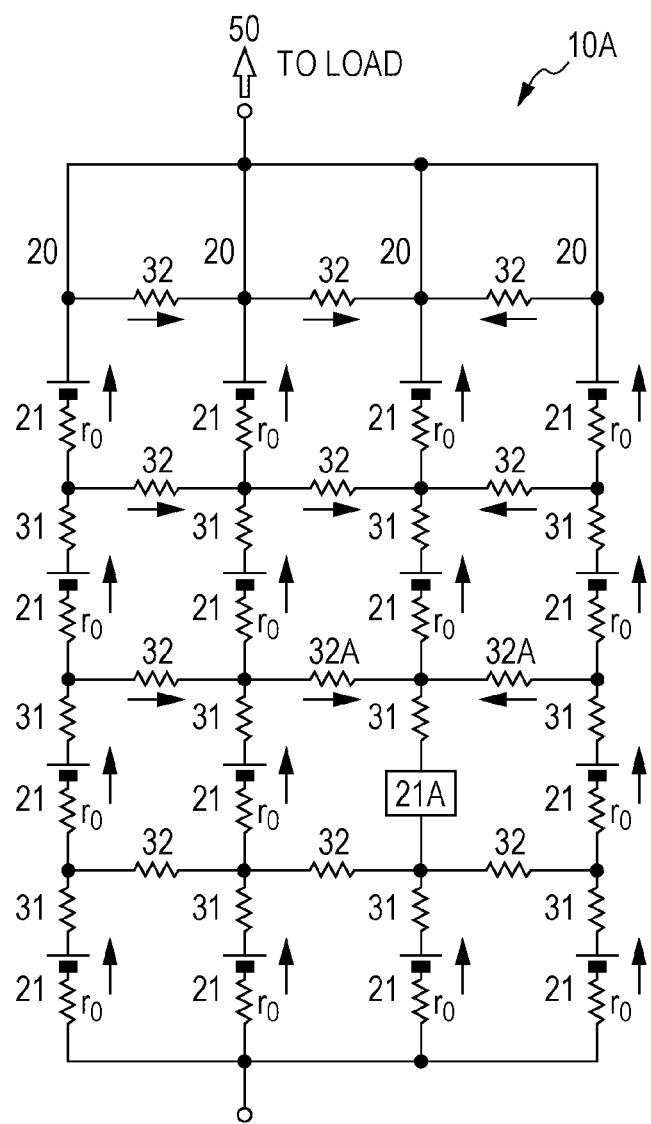
FIG. 3 is a circuit diagram when abnormality has occurred in a secondary battery cell constituting the assembled battery of Example 1.

Example 1 relates to the assembled batteries related to the first embodiment, the third embodiment, and the fourth embodiment of the present disclosure. A schematic diagram of the assembled battery of Example 1 viewed from one side is illustrated in FIG. 1A and a schematic diagram of the assembled battery of Example 1 viewed from the opposite side is illustrated in FIG. 1B. Further, circuit diagrams of the assembled battery of Example 1 are illustrated in FIGS. 2 and 3.

An assembled battery 10A or 10B of Example 1 or Example 2 which will be described later is an assembled battery which includes a plurality of (in the illustrated example, four) secondary battery cell series modules 20 each having a plurality of (in the illustrated example, four) secondary battery cells 21 connected in series. That is, the number of secondary battery cells 21 constituting the assembled battery is sixteen in the illustrated example. However, the number of secondary battery cells constituting the assembled battery is not limited thereto. Then, in each secondary battery cell series module 20, the secondary battery cells 21 are connected in series by a first connection member 31 and the secondary battery cell 21 constituting the secondary battery cell series module 20 and the secondary battery cell 21 constituting the secondary battery cell series module 20 adjacent to the above secondary battery cell series module 20 are connected in parallel by a second connection member 32. That is, when the number of series-connected secondary battery cells 21 constituting the secondary battery cell series module 20 is set to be N and the number of secondary battery cell series modules 20 is set to be M, the n-th (n=1, 2, . . . or N) secondary battery cells 21 constituting the respective secondary battery cell series modules 20 are connected in parallel in M secondary battery cell series modules 20.

In Example 1 or Example 2 which will be described later, the secondary battery cell 21 was set to be a cylindrical lithium-ion secondary battery. However, it is not limited thereto. In order to control charge and discharge of the assembled battery 10A or 10B, the assembled battery 10A or 10B is connected to a charge and discharge control circuit (not shown) through a wiring and a battery pack is constituted by the assembled battery 10A or 10B and the charge and discharge control circuit. The charge and discharge control circuit is constituted by an existing circuit provided with an MPU or a storage section (including, for example, an EEPROM). The charge and discharge control circuit is provided with an existing battery protection circuit, and in order to halt the function of the battery pack as appropriate, the battery protection circuit is operated.

Then, in Example 1, the electrical resistance value $R_2$ of the second connection member 32 is higher than the electrical resistance value $R_1$ of the first connection member 31. Further, the melting point of a material constituting the second connection member 32 is lower than the melting point of a material constituting the first connection member 31.

In Example 1, specifically, the first connection member 31 is constituted by a band-shaped material made of copper (melting point: 1084° C.) and the positive electrode of the secondary battery cell 21 and the negative electrode of the secondary battery cell 21 adjacent to the above secondary battery cell 21 are connected to each other by the first connection member 31. Specifically, the first connection member 31 is fixed to the positive electrode and the negative electrode on the basis of a resistance welding method. Further, in Example 1, the second connection member 32 is constituted by a band-shaped material in which, for example, a tin (melting point: 232° C.) plating layer is formed on one surface of an insulating material such as ABS resin, and the positive electrode or the negative electrode of the secondary battery cell 21 is connected to the positive electrode or the negative electrode of the secondary battery cell 21 adjacent to the above secondary battery cell 21 by the second connection member 32. Specifically, the second connection member 32 is fixed to the first connection member 31 fixed to the secondary battery cell 21, on the basis of a resistance welding method. Here, the volume resistance value at a room temperature of copper which is a material constituting the first connection member 31 is $1.72 \times 10^{-8}$ Ω·m and the volume resistance value at a room temperature of tin which is a material constituting the second connection member 32 is $1.28 \times 10^{-7}$ Ω·m. Then, if the thickness, the width, and the length of the first connection member 31 are respectively set to be 0.1 mm, 15 mm, and 20 mm and the thickness, the width, and the length of the tin plating layer of the second connection member 32 are respectively set to be 0.01 mm, 0.2 mm, and 40 mm, $R_1$=0.2 mΩ and $R_2$=2.56Ω. In addition, a relationship of $R_2/R_1 \geq 10$ is satisfied.

The assembled battery 10A of Example 1 is an assembled battery which includes a plurality of secondary battery cell series modules 20 each having a plurality of secondary battery cells 21 connected in series in this manner. Then, performing explanation in accordance with the assembled battery related to the fourth embodiment of the present disclosure, in each secondary battery cell series module 20, the secondary battery cells 21 are connected in series by the first connection member 31 and mutually supported by the first connection member 31, the secondary battery cell 21 constituting the secondary battery cell series module 20 and the secondary battery cell 21 constituting another secondary battery cell series module 20 are connected in parallel by the second connection member 32 and mutually supported by the second connection member 32. That is, the states shown in FIGS. 1A and 1B are maintained without any assistance. Then, the electrical resistance value $R_2$ of the second connection member 32 is higher than the electrical resistance value $R_1$ of the first connection member 31. In this manner, since the secondary battery cells 21 are mutually supported by the first connection member 31 and the second connection member 32, handling or the like of the assembled battery is facilitated.

Further, performing explanation in accordance with the assembled battery related to the third embodiment of the present disclosure, the assembled battery 10A of Example 1 is electrically connected to a load 50 such as an electric power-assisted bicycle, an electric-powered scooter, a motor of an electric vehicle, or household electric equipment, for example. Here, the electrical resistance value $R_2$ of the second connection member 32 is higher than the electrical resistance value $R_1$ of the first connection member 31, and when the electrical resistance value of the load is set to be $R_0$, the maximum value of $R_0$ is, for example, $R_0=1\Omega$ and a relationship of $R_2/R_0 \geq 2$ is satisfied. Therefore, it is possible to effectively suppress generation of an electric current in which a flow direction in the secondary battery cell 21 is different from a normal direction (a countercurrent of an electric current in the secondary battery cell).

In the following explanation, the secondary battery cell series module which includes an abnormal secondary battery cell is referred to as an "abnormal secondary battery cell series module" for convenience sake and the secondary battery cell series module which includes only a normal secondary battery cell is referred to as a "normal secondary battery cell series module" for convenience sake.

As long as there is no bias in performance of the secondary battery cell 21 at the time of discharge and after the discharge state of the assembled battery 10A becomes an equilibrium state, as shown in the circuit diagram of FIG. 2, an electric current flows in the secondary battery cells 21. That is, in stages other than the final stage of the secondary battery cell series module, an electric current does not flow in a parallel direction. In addition, in FIGS. 2 to 5, the flow of an electric current which flows is indicated by an arrow. Here, as shown in FIG. 3, in a case where an internal short-circuit has occurred in a third secondary battery cell 21A of the third secondary battery cell series module, an electric current flows from the secondary battery cells 21 constituting the adjacent normal secondary battery cell series module into the secondary battery cells 21 constituting the abnormal secondary battery cell series module which includes the abnormal secondary battery cell 21A. However, since the second connection member 32 is interposed, it is possible to keep a current value low. In this manner, in the assembled battery 10A of Example 1, despite a simple configuration and structure, high safety can be secured even in a case where an internal short-circuit has occurred in the secondary battery cell 21 constituting the assembled battery 10A. Further, in the assembled battery 10A of Example 1, since the melting point of a material constituting the second connection member 32 is lower than the melting point of a material constituting the first connection member 31, in a case where a great current flows in the second connection member 32, as will be described next, the second connection member 32 is melted and cut, thereby functioning as a fuse, so that even higher safety can be secured.

The output voltage of the secondary battery cell 21 was set to be 3.7 volts and an internal resistance value $r_0$ of the secondary battery cell 21 was set to be $0.01\Omega$. Further, M was set to be 4 and N was set to be 4. Incidentally, since the electrical resistance value $R_0$ of the load is $1\Omega$, if the secondary battery cell 21A enters into a short-circuit state, 714 milliamperes of electric current $I_{32A}$ flows in a second connection member 32A. That is, the amount of heat generation becomes $I_{132A} \times R_2^2 = 0.714 \times 2.56^2 = 4.68$ watts. Further, the second connection member 32 is made of tin, the specific heat of tin is $0.22$ $J \cdot K^{-1} \cdot g^{-1}$, and the density is $7.31 \times 10^{-3}$ g/mm$^3$. Further, the volume of the second connection member 32 is $0.01$ mm$\times 0.2$ mm$\times 40$ mm$=0.08$ mm$^3$ and the mass is $5.85 \times 10^{-4}$ grams. Therefore, heat capacity becomes $1.29 \times 10^{-4}$ $J \cdot K^{-1}$. If the temperature of the second connection member 32 is set to be $25°$ C., a temperature difference between it and the melting point, $232°$ C., becomes $207°$ C., energy necessary for melting of the second connection member 32A becomes $0.027$ J, and the second connection member 32A is melted in $0.006$ seconds.

Example 2

Figure 4:
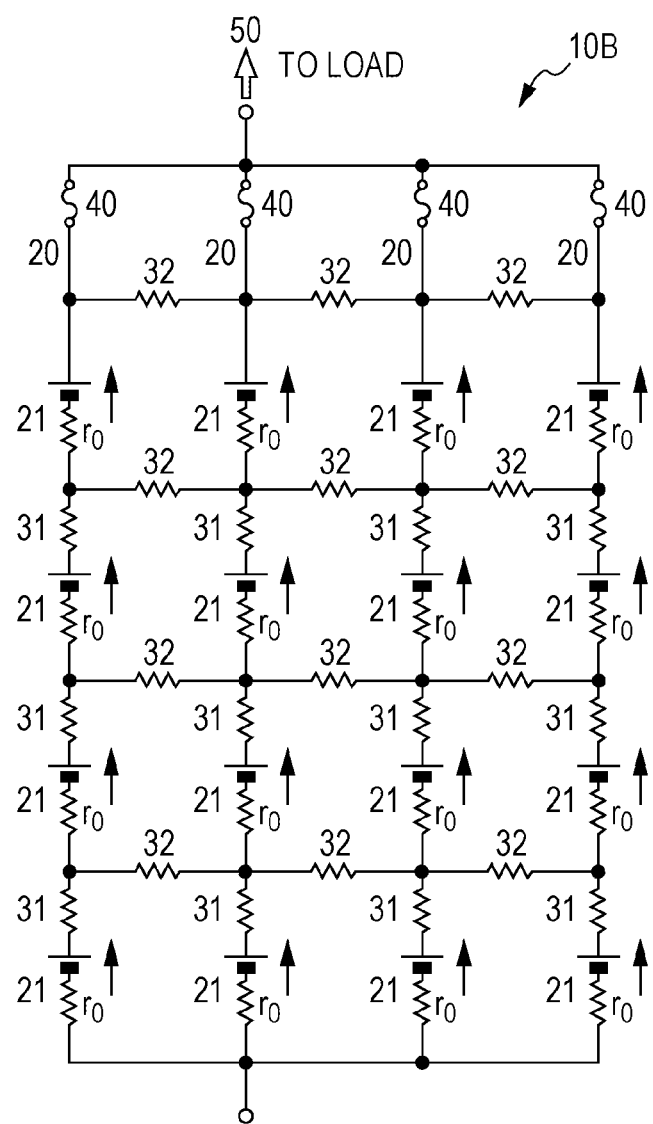
FIG. 4 is a circuit diagram when an assembled battery of Example 2 is normally operated.
Figure 5:
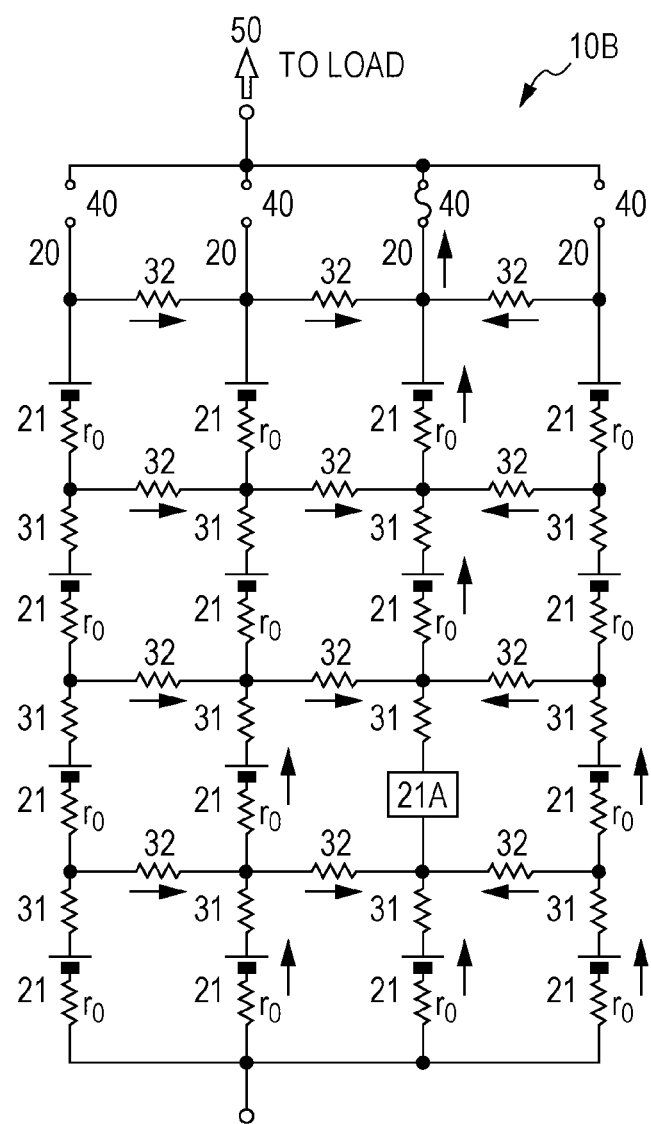
FIG. 5 is a circuit diagram when abnormality has occurred in a secondary battery cell constituting the assembled battery of Example 2.

Example 2 relates to the assembled batteries related to the second embodiment, the third embodiment, and the fourth embodiment of the present disclosure. A schematic diagram of the assembled battery of Example 2 viewed from one side and a schematic diagram of the assembled battery of Example 2 viewed from the opposite side are the same as FIGS. 1A and 1B. Circuit diagrams of the assembled battery of Example 2 are illustrated in FIGS. 4 and 5.

Also in the assembled battery 10B of Example 2, the electrical resistance value $R_2$ of a second connection member 62 is higher than the electrical resistance value $R_1$ of a first connection member 61. Further, a current breaker 40 is provided at one end of each secondary battery cell series module 20. In addition, in FIGS. 1A and 1B, the current breaker 40 is not shown. The current breaker 40 is connected in series between the output end of the secondary battery cell series module 20 and the secondary battery cell 21. The current breaker 40 is specifically constituted by a fuse (a power fuse) and melted and cut if 10 amperes of electric current flows. In Example 2, when abnormality (for example, an internal short-circuit) has occurred in the secondary battery cell, the current breakers 40 in the secondary battery cell series modules (normal secondary battery cell series modules) other than the secondary battery cell series module (an abnormal secondary battery cell series module) which includes the secondary battery cell in which abnormality has occurred perform cutoff operations. Further, occurrence of abnormality in the secondary battery cell is detected by the cutoff operation of the current breaker 40. Specifically, a detecting section that detects a conduction/non-conduction state of the current breaker 40 is disposed and generation of a cutoff operation in the current breaker 40 can be detected by detecting change-over of the current breaker 40 which is in a conduction state to a non-conduction state in a charge and discharge control circuit (not shown). As the detecting section that detects a conduction/non-conduction state of the current breaker 40, more specifically, a conduction detection circuit using a transistor can be given.

In Example 2, the first connection member 61 is made of copper and the second connection member 62 is made of nichrome (the volume resistance value at a room temperature: $1.40 \times 10^{-6}$ $\Omega \cdot$m). Specifically, since the thickness, the width, and the length of the first connection member 61 were respectively set to be 0.1 mm, 15 mm, and 20 mm, $R_1=0.2$ ml). On the other hand, since the thickness, the width, and the length of the second connection member 62 were respectively set to be 0.02 mm, 0.1 mm, and 40 mm, $R_2=28.0\Omega$. In addition, a relationship of $R_2/R_1 \geq 10$ is satisfied. Then, the positive electrode of the secondary battery cell 21 and the negative electrode of the secondary battery cell 21 adjacent to the above secondary battery cell 21 are connected to each other by the first connection member 61 on the basis of a resistance welding method. Further, the positive electrode or the negative electrode of the secondary battery cell 21 is connected to the positive electrode or the negative electrode of the secondary battery cell 21 adjacent to the above secondary battery cell 21 by the second connection member 62 on the basis of a resistance welding method. More specifically, the second connection member 62 is fixed to the first connection member 61 fixed to the secondary battery cell 21, on the basis of a resistance welding method.

In addition, also in Example 2, similarly to Example 1, the second connection member 62 may also be constituted by a band-shaped material in which a nichrome plating layer is formed on one surface of an insulating material such as ABS resin. In this way, a configuration can be made in which in each secondary battery cell series module 20, the secondary battery cells 21 are connected in series by the first connection member 61 and mutually supported by the first connection member 61 and the secondary battery cell 21 constituting the secondary battery cell series module 20 and the secondary battery cell 21 constituting another secondary battery cell series module 20 are connected in parallel by the second connection member 62 and mutually supported by the second connection member 62. That is, the states shown in FIGS. 1A and 1B can be maintained without any assistance.

The assembled battery 10B of Example 2 is electrically connected to the load 50 such as an electric power-assisted bicycle, an electric-powered scooter, a motor of an electric vehicle, or household electric equipment, for example. Here, the electrical resistance value $R_2$ of the second connection member 62 is higher than the electrical resistance value $R_1$ of the first connection member 61, and when the electrical resistance value of the load is set to be $R_0$, the maximum value of $R_0$ is, for example, $R_0 = 10\Omega$ and a relationship of $R_2/R_0 \geq 2$ is satisfied.

Also in Example 2, the output voltage of the secondary battery cell 21 was set to be 3.7 volts and the internal resistance value $r_0$ of the secondary battery cell 21 was set to be $0.01\Omega$. In addition, since $R_1 = 0.2$ m$\Omega$ and the internal resistance value $r_0$ of the secondary battery cell 21 is $0.01\Omega$, the electrical resistance value of the first connection member 61 is a negligible value. Further, M was set to be 4 and N was set to be 4.

If the load 50 of 10 ohms is connected to the assembled battery 10B (more specifically, a battery pack), after the discharge state of the assembled battery 10B becomes an equilibrium state, 0.37 amperes of electric current flows from each secondary battery cell 21 and 1.48 amperes of electric current flows to the load 50. At this time, an electric current does not flow to the second connection member 62 in a parallel direction (refer to FIG. 4).

Here, if the internal short-circuit occurs in the secondary battery cell 21, 23.3 amperes of electric current flows out from each normal secondary battery cell series module 20 other than the abnormal secondary battery cell series module 20 and 68.8 amperes of electric current tries to flow into the abnormal secondary battery cell series module 20. In Example 2, the current breaker 40, which is made of a fuse that is melted and cut if 10 amperes of electric current flows, is disposed at the output end side of each secondary battery cell series module 20. Therefore, all the current breakers 40 in the respective normal secondary battery cell series modules 20 other than the abnormal secondary battery cell series module 20 are melted and cut. Then, as shown in FIG. 5, an electric current flows from the adjacent normal secondary battery cell series module 20 into the abnormal secondary battery cell series module 20 through the second connection members 62, and an electric current is output only from the abnormal secondary battery cell series module 20. In addition, an electric current entirely flows in the two second connection members 62 adjacent to the abnormal secondary battery cell 21A and an electric current does not flow so much in the second connection members 62 which are not adjacent to the abnormal secondary battery cell 21A. At this time, since any secondary battery cell is not exposed to rapid discharge or charge, the assembled battery 10B can be used safely. However, since the voltage of the normal secondary battery cell series module is 14.8 volts, whereas voltage drop corresponding to one secondary battery cell occurs, 11.1 volts is obtained. Therefore, 1.11 amperes of electric current flows to the load 50 of 10$\Omega$.

By monitoring a voltage drop at the instant or the meltdown state of the current breaker 40, it is possible to determine occurrence of an internal short-circuit in the secondary battery cell without monitoring the state of each secondary battery cell. Therefore, in this assembled battery (more specifically, a battery pack), it is possible to signal abnormality to an apparatus which uses this battery pack. For example, in a case where it is used in an electric vehicle, in response to the abnormality, the electric vehicle side can switch connection to a spare assembled battery (battery pack) or inform a user of occurrence of abnormality, thereby prompting the user to stop the vehicle at a safe place in a short time.

In this manner, in the assembled battery 10B of Example 2, since the assembled battery 10B is provided with the second connection member 62, despite simple configuration and structure, high safety can be secured even in a case where an internal short-circuit has occurred in the secondary battery cell 21 constituting the assembled battery 10B. Further, in the assembled battery 10B of Example 2, since the current breaker 40 is provided at one end of each secondary battery cell series module 20, in a case where a great current flows in the second connection member series module 20, the current breaker 40 is operated, whereby the outputs from some second connection member series modules 20 are stopped and the outputs from the remaining second connection member series modules 20 are not stopped, so that even higher safety can be secured.

The present disclosure has been described above on the basis of the preferred examples. However, the present disclosure is not limited to these examples. The configurations, the structures, the connection relationships, and the like of the assembled batteries, the battery packs, and the like described in the examples are exemplifications and can be appropriately changed. The assembled battery of Example 2 can be applied to the assembled battery described in Example 1. The assembled battery in the present disclosure can be applied to power consumption apparatuses such as an electric vehicle (including a hybrid vehicle), a golf cart, an electric-powered cart, an electric-powered motorcycle, an electric-powered scooter, an electric power-assisted bicycle, a railway vehicle, for example. Then, it is possible to discharge the assembled battery for the driving of a conversion device (specifically, for example, a motor) which is provided at each of these apparatuses and converts electric power into a driving force by supplying electric power, and to charge the assembled battery by using regenerative energy from such a device. In addition, each of these power consumption apparatuses is provided with, for example, a control device which includes a remaining battery level display, or a control device which performs information processing regarding control of the power consumption apparatus on the basis of information about the secondary battery cell.

It should be understood that various changes and modifications to the presently preferred embodiments described herein will be apparent to those skilled in the art. Such The application is claimed as follows:

1. An assembled battery comprising:
a plurality of secondary battery cell series modules each having a plurality of secondary battery cells connected in series, the plurality of secondary battery cell series modules including a first secondary battery cell series module and a second secondary battery cell series module adjacent to the first secondary battery cell series module,
a first connection member that connects in series the secondary battery cells of each of the plurality of secondary battery cell series modules, and
a second connection member that connects in parallel the first secondary battery cell series module and the second secondary battery cell series module,
wherein an electrical resistance value of the second connection member is higher than an electrical resistance value of the first connection member,
wherein a melting point of a material comprising the second connection member is lower than a melting point of a material comprising the first connection member,
wherein the material comprising the first connection member is selected from the group consisting of: copper, aluminum, nickel, chrome and alloys thereof, and
wherein the material comprising the second connection member is selected from the group consisting of: indium, an indium-gold based alloy; $Sn_{80}Ag_{20}$, $Sn_{95}Cu_5$, $Pb_{97.5}Ag_{2.5}$, $Pb_{94.5}Ag_{5.5}$, and $Pb_{97.5}Ag_{1.5}Sn_{1.0}$.

2. The assembled battery according to claim 1, wherein the melting point of the material comprising the second connection member is 232° C. or less.

3. The assembled battery according to claim 1, wherein when the electrical resistance value of the first connection member is set to be $R_1$ and the electrical resistance value of the second connection member is set to be $R_2$, a relationship of $R_2/R_1 \geq 10$ is satisfied.

4. The assembled battery according to claim 1, wherein a current breaker is provided at one end of each secondary battery cell series module.

5. The assembled battery according to claim 4, wherein when an abnormality has occurred in the secondary battery cell, the current breakers in the secondary battery cell series modules other than the secondary battery cell series module which includes the secondary battery cell in which the abnormality has occurred perform cutoff operations.

6. The assembled battery according to claim 4, wherein occurrence of an abnormality in the secondary battery cell is detected by a cutoff operation of the current breaker.

7. The assembled battery according to claim 1, wherein when an electrical resistance value of a load which is electrically connected to the assembled battery is set to be $R_0$ and the electrical resistance value of the second connection member is set to be $R_2$, a relationship of $R_2/R_0 \geq 2$ is satisfied.

8. An assembled battery comprising:
a plurality of secondary battery cell series modules each having a plurality of secondary battery cells connected in series, the plurality of secondary battery cell series modules including a first secondary battery cell series module and a second secondary battery cell series module adjacent to the first secondary battery cell series module,
a first connection member that connects in series the secondary battery cells of each secondary battery cell series module,
a second connection member that connects in parallel the first secondary battery cell series module and the second secondary battery cell series module,
a current breaker provided at one end of each of the plurality of secondary battery cell series modules,
wherein an electrical resistance value of the second connection member is higher than an electrical resistance value of the first connection member,
wherein the material comprising the first connection member is selected from the group consisting of: copper, aluminum, nickel, chrome and alloys thereof, and
wherein the material comprising the second connection member is selected from the group consisting of: indium, an indium-gold based alloy; $Sn_{80}Ag_{20}$, $Sn_{95}Cu_5$, $Pb_{97.5}Ag_{2.5}$, $Pb_{94.5}Ag_{5.5}$, and $Pb_{97.5}Ag_{1.5}Sn_{1.0}$.

9. The assembled battery according to claim 8, wherein when an abnormality has occurred in the secondary battery cell, the current breakers in the secondary battery cell series modules other than the secondary battery cell series module which includes the secondary battery cell in which the abnormality has occurred perform cutoff operations.

10. The assembled battery according to claim 8, wherein occurrence of an abnormality in the secondary battery cell is detected by a cutoff operation of the current breaker.

11. The assembled battery according to claim 8, wherein when the electrical resistance value of the first connection member is set to be $R_1$ and the electrical resistance value of the second connection member is set to be $R_2$, a relationship of $R_2/R_1 \geq 10$ is satisfied.

12. An assembled battery comprising:
a plurality of secondary battery cell series modules each having a plurality of secondary battery cells connected in series, the plurality of secondary battery cell series modules including a first secondary battery cell series module and a second secondary battery cell series module adjacent to the first secondary battery cell series module,
a first connection member that connects in series the secondary battery cells of each secondary battery cell series module, and
a second connection member that connects in parallel the first secondary battery cell series module and the second secondary battery cell series module,
wherein an electrical resistance value of the second connection member is higher than an electrical resistance value of the first connection member,
wherein when an electrical resistance value of a load which is electrically connected to the assembled battery is set to be $R_0$ and the electrical resistance value of the second connection member is set to be $R_2$, a relationship of $R_2/R_0 \geq 2$ is satisfied,
wherein the material comprising the first connection member is selected from the group consisting of: copper, aluminum, nickel, chrome and alloys thereof, and
wherein the material comprising the second connection member is selected from the group consisting of:

indium, an indium-gold based alloy; $Sn_{80}Ag_{20}$, $Sn_{95}Cu_5$, $Pb_{97.5}Ag_{2.5}$, $Pb_{94.5}Ag_{5.5}$, and $Pb_{97.5}Ag_{1.5}Sn_{1.0}$.

13. The assembled battery according to claim 12, wherein when the electrical resistance value of the first connection member is set to be $R_1$ and the electrical resistance value of the second connection member is set to be $R_2$, a relationship of $R_2/R_1 \geq 10$ is satisfied.

14. An assembled battery comprising:
a plurality of secondary battery cell series modules each having a plurality of secondary battery cells connected in series, the plurality of secondary battery cell series modules including a first secondary battery cell series module and a second secondary battery cell series module adjacent to the first secondary battery cell series module,
a first connection member that connects in series the secondary battery cells of each secondary battery cell series module, and
a second connection member that connects in parallel the first secondary battery cell series module and the second secondary battery cell series module,
wherein an electrical resistance value of the second connection member is higher than an electrical resistance value of the first connection member,
wherein the material comprising the first connection member is selected from the group consisting of: copper, aluminum, nickel, chrome and alloys thereof, and
wherein the material comprising the second connection member is selected from the group consisting of: indium, an indium-gold based alloy; $Sn_{80}Ag_{20}$, $Sn_{95}Cu_5$, $Pb_{97.5}Ag_{2.5}$, $Pb_{94.5}Ag_{5.5}$, and $Pb_{97.5}Ag_{1.5}Sn_{1.0}$.

15. The assembled battery according to claim 14, wherein when the electrical resistance value of the first connection member is set to be $R_1$ and the electrical resistance value of the second connection member is set to be $R_2$, a relationship of $R_2/R_1 \geq 10$ is satisfied.

16. A power consumption apparatus provided with the assembled battery according to claim 1.

17. An assembled battery comprising:
a plurality of secondary battery cell series modules each having a plurality of secondary battery cells connected in series, the plurality of secondary battery cell series modules including a first secondary battery cell series module and a second secondary battery cell series module adjacent to the first secondary battery cell series module,
a first connection member that connects in series the secondary battery cells of each secondary battery cell series module,
a second connection member that connects in parallel the first secondary battery cell series module and the second secondary battery cell series module, and
a current breaker provided at one end of each of the plurality of secondary battery cell series modules,
wherein an electrical resistance value of the second connection member is higher than an electrical resistance value of the first connection member,
wherein a melting point of a material comprising the second connection member is lower than a melting point of a material comprising the first connection member,
wherein the material comprising the first connection member is selected from the group consisting of: copper, aluminum, nickel, chrome and alloys thereof, and
wherein the material comprising the second connection member is selected from the group consisting of: indium, an indium-gold based alloy; $Sn_{80}Ag_{20}$, $Sn_{95}Cu_5$, $Pb_{97.5}Ag_{2.5}$, $Pb_{94.5}Ag_{5.5}$, and $Pb_{97.5}Ag_{1.5}Sn_{1.0}$.

18. The assembled battery according to claim 17, wherein when an abnormality has occurred in the secondary battery cell, the current breakers in the secondary battery cell series modules other than the secondary battery cell series module which includes the secondary battery cell in which the abnormality has occurred perform cutoff operations.

19. The assembled battery according to claim 17, wherein occurrence of an abnormality in the secondary battery cell is detected by a cutoff operation of the current breaker.

20. The assembled battery according to claim 1, wherein a cross-sectional area of the first connection member, a material comprising the first connection member, a cross-sectional area of the second connection member, and a material comprising the second connection member are configured such that the first connection member has a lower electrical resistance than the second connection member.

21. The assembled battery according to claim 1, wherein the first connection member is fixed at one end to a positive electrode of one of the battery cells in a secondary battery cell series module and at an opposite end to a negative electrode of an adjacent one of the battery cells in the secondary battery cell series module.

22. The assembled battery according to claim 1, wherein the second connection member functions as a fuse that is melted and cut if a current above a predetermined value flows in the second connection member.

* * * * *